(12) United States Patent
Hong et al.

(10) Patent No.: US 6,636,007 B2
(45) Date of Patent: Oct. 21, 2003

(54) DC BRUSHLESS VIBRATION MOTOR

(75) Inventors: Alex Hong, Kaohsiung (TW);
Ching-Shen Horng, Kaohsiung (TW);
Tso-kuo Yin, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 139 days.

(21) Appl. No.: 09/804,173

(22) Filed: Mar. 12, 2001

(65) Prior Publication Data

US 2002/0125842 A1 Sep. 12, 2002

(51) Int. Cl.[7] .......................... H02K 7/075; H02K 7/065
(52) U.S. Cl. ..................... 318/114; 310/67 R; 310/254; 310/257; 310/81
(58) Field of Search .................. 310/40 MM, 81, 310/156.12, 261, 268, 179, 67 R, 216, 254, 257

(56) References Cited

U.S. PATENT DOCUMENTS

| | | | |
|---|---|---|---|
| 4,381,465 A | | 4/1983 | Renkl et al. .............. 310/49 R |
| 5,097,170 A | * | 3/1992 | Baines ...................... 310/268 |
| 5,373,207 A | | 12/1994 | Yamaguchi et al. .......... 310/81 |
| 5,786,645 A | * | 7/1998 | Obidniak .................. 310/68 R |
| 5,945,765 A | * | 8/1999 | Chen ........................ 310/257 |
| 6,002,927 A | * | 12/1999 | Hayes, Jr. .................. 455/351 |
| 6,169,348 B1 | | 1/2001 | Won .......................... 310/81 |
| 6,479,914 B2 | * | 11/2002 | Yoshida et al. .............. 310/81 |

FOREIGN PATENT DOCUMENTS

| | | | |
|---|---|---|---|
| DE | 197 23 664 | | 12/1997 |
| EP | 0 066 643 | | 12/1982 |
| EP | 0 464 644 | | 1/1992 |
| EP | 1 035 633 | | 9/2000 |
| JP | 06-233523 A | * | 8/1994 |
| JP | 11098761 | | 4/1999 |
| JP | 11-341769 A | * | 12/1999 |
| WO | WO 99/01849 | | 1/1999 |

* cited by examiner

*Primary Examiner*—Nicholas Ponomarenko
*Assistant Examiner*—Judson H. Jones
(74) *Attorney, Agent, or Firm*—Baker & McKenzie (57) ABSTRACT

A DC brushless vibration motor is disclosed to comprise of a stator, a rotor, a drive circuit and a casing. The stator has an upper magnetic pole piece, a lower magnetic pole piece and a stator field winding. The stator field winding is contained inside a ring-shaped space formed by the upper and lower magnetic pole pieces. The internal rotor has a center of mass offset from the center axis of rotation and comprises a ring magnet and an eccentric weight. The eccentric weight has a structural configuration of a ring body, and the ring magnet is securely fixed to the external peripheral surface of the eccentric weight. The drive circuit has a drive integrated circuit for controlling the rotation of the rotor by receiving an externally-supplied electric power. The casing securely encloses the stator and rotor while maintaining an air gap therebetween for generating mechanical vibration when the rotor is propelled to rotate by the stator.

52 Claims, 4 Drawing Sheets

DC BRUSHLESS VIBRATION MOTOR

FIELD OF THE INVENTION

This invention relates in general to a vibration motor and, in particular, to a DC brushless vibration motor having a rotor with a built-in eccentric weight.

BACKGROUND OF THE INVENTION

Mechanical vibrations are required for many different applications. Vibrations for material pulverization and selection in industrial use, vibration for home massage machines, and silent notification of incoming calls and messages for mobile phone handsets and pagers, are but a few examples of mechanical vibration applications.

There are various methods that can be used to produce mechanical vibrations. One method involves the use of electric motors. For motor-based vibration generation, at least two types of vibration-producing devices are known. The first type involves the attachment of an eccentric weight to the output shaft of a conventional motor, which normally operates by rotating smoothly without any intention of vibration. Vibration is produced due to the eccentricity of the rotating part of the system as a result of the presence of the eccentric weight attached to the output shaft of the motor. However, since the eccentric weight is external to the motor housing, additional shielding means must sometimes be provided to avoid undesired impact by the rotating part of the system on the surroundings. The other type of motor-based vibration generation employs a rotor that is itself eccentric-weighted. The rotation of its rotor automatically generates vibration without any need for additional device to be attached to the rotor shaft of the motor.

Thus, a vibration motor is a type of vibration-generating device that provides mechanical vibration by the rotation of its rotor. Normally, it is an objective of a traditional motor to reduce possible vibrations. In contrast, a vibration motor has an objective of intentionally producing mechanical vibration. In the following descriptive text of this specification, the term "vibration motor" is used specifically to refer to the motor-based vibration devices having built-in eccentric rotors.

A DC commutator motor having a non-symmetric rotor with center of mass offset from the rotor axis of rotation is known in U.S. Pat. No. 6,169,348 to Wan ("Flat Type Two-Phase Vibration Motor"). Wan discloses a flat type two-phase DC commutator motor that employs a rotor with a mechanically asymmetric construction. Since the center of mass of the asymmetric rotor is not on the center axis of rotation of the rotor, mechanical vibration was produced as the rotor of the vibration motor was driven. However, Wan's vibration motor requires the use of a commutator-brush pair so as to supply electric power to the armature coil of its rotor.

Commutation of electric power required for the operation of Wan's vibration motor relies on the mechanical friction between the brushes and the commutator. Mechanical friction inevitably wears out both the brushes and the commutating segments of the commutator. Electrical shorting between consecutive segments of the commutator is also inevitable due to carbon accumulation resulting from mechanical friction. Moreover, intermittent electrical conduction between the brushes and the commutator segments produces undesirable electromagnetic emission that may interfere with nearby electronic devices. Without proper shielding, circuits such as the control electronics of the motor itself may fail due to excessive EM interference.

Further, the wearing out of the brushes and the commutator reduces the useful lifetime of this type of vibration motor. Still further, the two phase configuration of Wan's vibration motor requires the use of a more complex power supply circuitry that must provide two electric power supplies with phase separation. When compared to a single-phase power source, the overall cost and circuit complexity of this type of commutator-based vibration motor is relatively high.

It is therefore an object of the present invention to provide a DC brushless vibration motor for producing mechanical vibration via rotation of an eccentric rotor that avoids the mechanical wear of components thereby providing an extended service life.

It is another object of the present invention to provide a DC brushless vibration motor for producing mechanical vibration via rotation of an eccentric rotor that produces little electromagnetic interference to the surrounding environment.

It is still another object of the present invention to provide a DC brushless vibration motor for producing mechanical vibration via rotation of an eccentric rotor that operates on a simple single-phase power supply, thereby providing reduced complexity of the motor drive circuitry.

It is yet another object of the present invention to provide a DC brushless vibration motor for producing mechanical vibration via rotation of an eccentric rotor that has a low manufacturing cost.

SUMMARY OF THE INVENTION

The invention achieves the above-identified objects by providing a DC brushless vibration motor that comprises a stator, a rotor, a drive circuit and a casing. The stator has an upper magnetic pole piece, a lower magnetic pole piece and a stator field winding. The stator field winding is contained inside a ring-shaped space formed by the upper and lower magnetic pole pieces. The internal rotor has a center of mass offset from the center axis of rotation and comprises a ring magnet and an eccentric weight. The eccentric weight has a structural configuration of a ring body, and the ring magnet is securely fixed to the external peripheral surface of the eccentric weight. The drive circuit has a drive integrated circuit for controlling the rotation of the rotor by receiving externally-supplied electric power. The casing securely encloses the stator and rotor while maintaining an air gap therebetween for generating mechanical vibration when the rotor is propelled to rotate by the stator.

BRIEF DESCRIPTION OF THE DRAWINGS

These and other features, aspects, and advantages of the invention will become better understood with regard to the following description, appended claims, and accompanying drawings where:

DETAILED DESCRIPTION OF THE INVENTION

Figure 1:
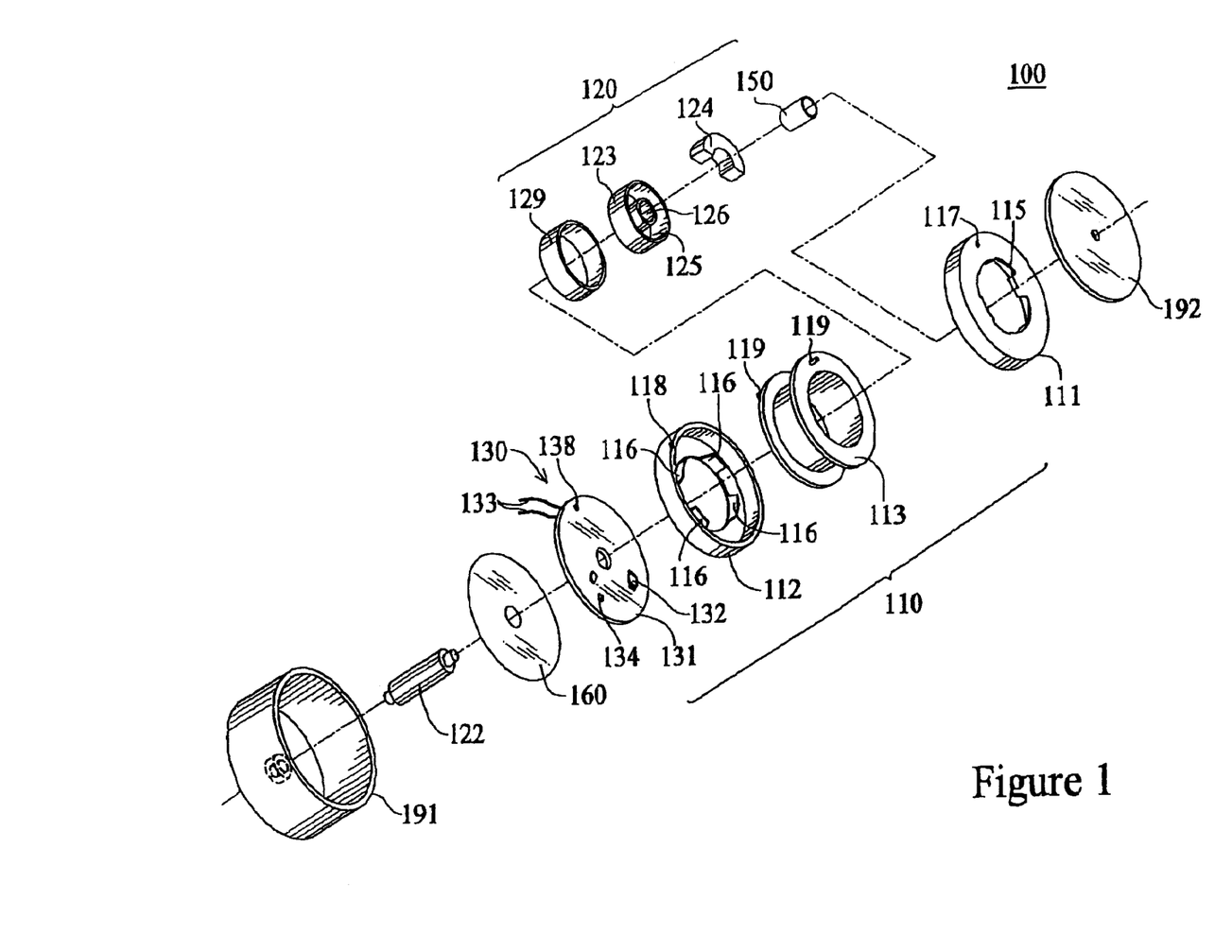
FIG. 1 is an exploded perspective view of a DC brushless vibration motor in accordance with an embodiment of the invention.
Figure 2:
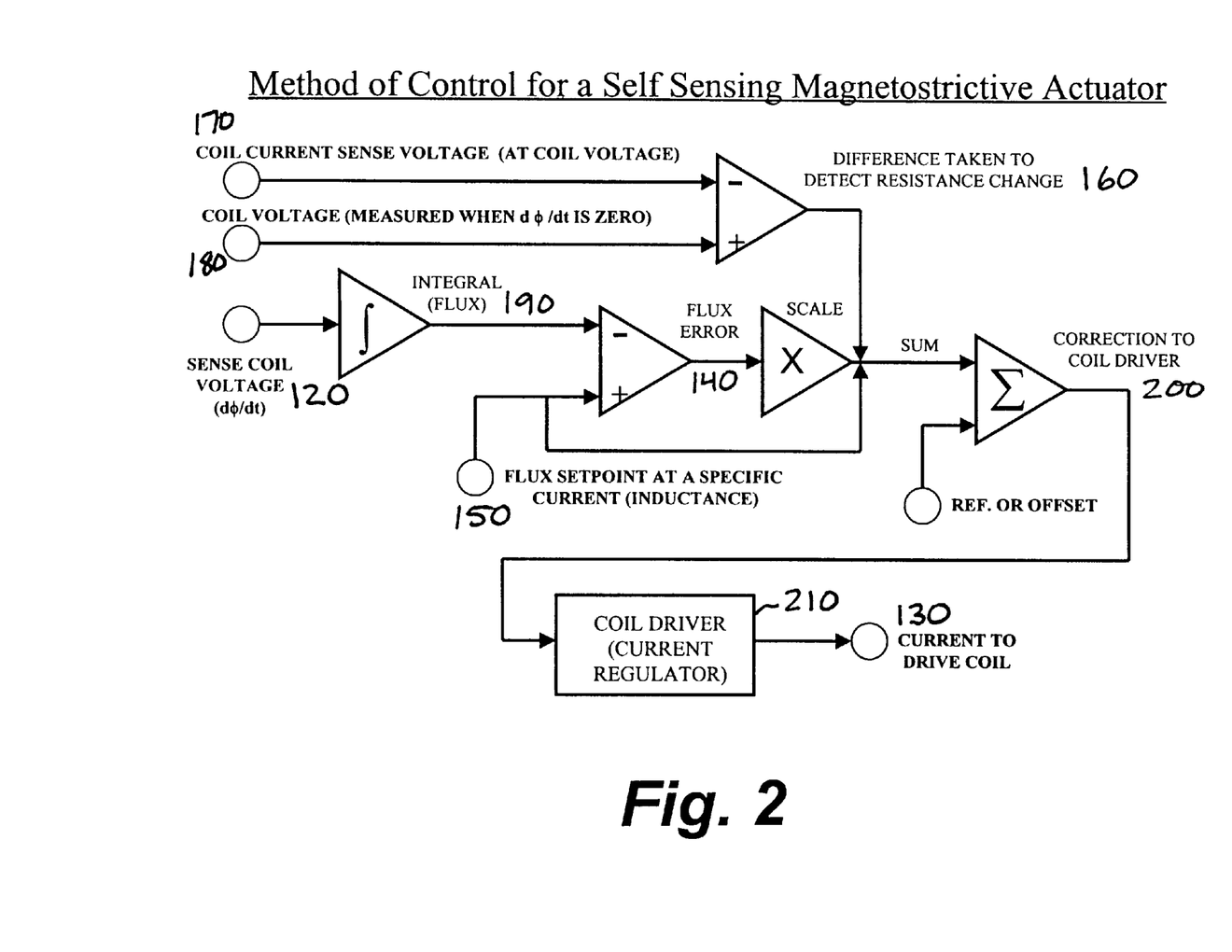
FIG. 2 is a cross-sectional view taken along a plane passing through a selected radial direction of the vibration motor of FIG. 1.

FIG. 1 is an exploded perspective view illustrating the structural configuration of a preferred embodiment of the present invention. All components of the vibration motor are illustrated separately in order to show their respective characteristics. FIG. 2, on the other hand, is a cross-sectional view taken along a plane passing through a selected radial direction of the vibration motor of FIG. 1 when assembled as a complete vibration motor. Reference can be made to FIGS. 1 and 2 simultaneously in the following descriptive paragraphs for the preferred embodiment of the vibration motor of the invention.

In accordance with the embodiment of FIG. 1, the DC brushless vibration motor of the invention in general has a configuration of an internal magnet rotor rotating inside a surrounding stator with a winding. Due to the fact that the intended function of a vibration motor is the generation of mechanical vibration and not the typical driving of an external load, there is therefore no need to have an extending output shaft that rotates externally to the body of the motor. As a result, an internal rotor-based configuration is more simple than that of a motor having an external rotor. The stator of an internal-rotor vibration motor may also serve as the shielding for the moving part—the vibrating rotor—of the device, protecting it from the surrounding environment where the motor is installed.

As is illustrated in the cross-sectional view of FIG. 2, the DC brushless vibration motor generally identified by reference numeral 100 has an external stator 110 and an internal rotor 120. An air gap 140 is properly maintained between the opposing surfaces of the stator 110 and rotor 120 when both are installed in position inside the protective casing 190 of the motor. As is known in the art, the radial length of the air gap between the stator and rotor of a motor is the smaller the better. Substantial dimension of the air gap of a motor is determined by various manufacturing tolerances. Note that in the exemplified embodiment of FIG. 1, the motor casing 190 is comprised of a generally cylindrical cup 191 and an end plate 192. The stator and rotor assembly of the vibration motor can be securely settled inside the recessed interior space of the cylindrical cup 191 with the end plate 192 effectively sealing the stator and rotor inside.

When compared to a commutator motor, a DC brushless motor requires an electronic driving circuit to provide the functionality of the mechanical combination of the brushes and the commutator. In the embodiment of the vibration motor of the present invention as depicted in FIGS. 1 and 2, a driving circuit 130 based on an integrated circuit (IC) 132 that is soldered to the printed circuit board (PCB) 131 is contained inside the motor casing 190 together with the stator 110 and rotor 120. Rotor 120 of the vibration motor 100, supported by an appropriate bearing means 150 to be described in detail in the following paragraphs, may thus be propelled inside the stator 110 to produce mechanical vibration under control of electronic driving circuitry 130.

As is illustrated in the cross-sectional view of FIG. 2, the stator 110 is comprised of a selected number of turns of conductor coils wound around a bobbin reel 113. Conductors wound around the bobbin reel 113 constitute a ring-shaped stator field winding 114 for the stator 110 which fits into the ring-shaped space formed by properly aligning the upper and lower magnetic pole pieces 111 and 112 respectively. The bobbin reel 113 can be made, for example, of plastic material that serves as a supporting frame for the multiple turns of conductors of the stator field winding 114.

Both the upper 111 and the lower magnetic pole piece 112 have a number of radially inward-facing magnetic pole plates 115 facing the air gap 140. In the described embodiment of FIG. 1, as is illustrated in the perspective view, four pole plates 115 and 116 on the upper and the lower magnetic pole pieces 111 and 112 respectively are aligned along the periphery of a 360-degree circle. Every two consecutive pole plates, either 115 or 116, are separated by 90 degrees. Plates 115 and 116 of the upper and lower magnetic pole pieces 111 and 112 respectively are interleaved to each other as the vibration motor 100 is assembled and constitute an eight-pole motor. As is comprehensible to persons skilled in the art, a vibration motor in accordance with the present invention may well utilize a configuration of more or fewer numbers of poles.

Upper and lower magnetic pole pieces 111 and 112 can be made, for example, low-carbon laminated steel. Pole pieces 111 and 112, when assembled, form a ringshaped space for containing the stator field winding 114. As mentioned, stator field winding 114 comprises multiple turns of conductor coils wound around the bobbin reel 113. As the conductors in the stator field winding 114 are energized by passing a current therethrough, magnetic pole pieces 111 and 112 constitute a flux path for the motor magnetic circuit. Pole pieces 111 and 112 as exemplified in the described embodiment can be manufactured utilizing low-cost methods such as the hydraulic pressing of sheet metal.

In operation, stator field winding 114 acts as an electromagnetic source that produces magnetic flux as a result of the excitation current it receives. The generated magnetic flux flows in the longitudinal direction of the generally cylindrical-shaped body of the stator 110 along the magnetic circuit inside the upper and lower magnetic pole pieces 111 and 112, which are located at both ends of the stator cylindrical body. The magnetic flux flows either in to or out from the pole plates 115 and 116 of the pole pieces 111 and 112 respectively and then in to or out from the rotor 120.

Depending on the polarity of the current excitation in the stator field winding 114, the flux passes across the air gap 140 in the radial direction either in to or out from the corresponding magnetic poles in the ring magnet 129 of the rotor 120. As the magnetic flux passes through closed loops of magnetic circuits formed in the stator 110, the air gap 140 and the rotor 120, mechanical driving force is developed and the rotor 120 is propelled to rotate and vibration produced.

Depending on the relative angular position of the rotor 120, the drive circuit 130 alternatively feeds driving current of positive and negative polarity into the stator field winding 114. As a result, the pole plates 115 and 116 of the upper and lower magnetic pole pieces 111 and 112 respectively may become alternatively energized as north and south poles respectively. With proper drive timing control, the rotor 120 can thus be propelled to rotate by the stator 110 in the desired direction of rotation.

In the process, as is known to persons skilled in the art, the drive circuit 130 relies on certain types of sensors to obtain information relating to the angular position of the rotor 120. Such information is necessary for controlling the timing and polarity of the driving current feed to the stator field winding 114. In the preferred embodiment, a Hall sensor 134 mounted on the PCB 131 of the drive circuit 130 provides this angular position information of the rotor 120 to the drive IC 132.

A positioning hole 138 may be formed at adequate location on the PCB 131 which can be used to receive a stud 119 protruding out of the top surface of the bobbin reel 113.

Positioning coupling of the hole 138 and the stud 119 allows the sensor 134 to be set to predetermined relative angular position with respect to the PCB 131 in which it is installed.

Note that both the pole plates 115 and 116 of the upper and lower magnetic pole pieces 111 and 112 respectively have a surface configuration asymmetric with respect to the longitudinal center axis of the vibration motor. For example, in the perspective view of FIG. 1, the pole plate 115 has one edge in one rotational direction tilted more than the other edge in the opposite direction. This asymmetry ensures the provision of a starting torque for the vibration motor. Without this asymmetry, each of the magnetic poles of the rotor 120 is most likely to be balanced, and thus trapped at a center position in a magnetic pole of the stator 110 when the motor is stopped and thus produces no starting torque upon re-start of the motor. This trapping pole is generated by the stator field winding 114 of the stator 110 via a corresponding pole plate when the motor is to be started from stall.

The stator structural configuration described above for the vibration motor of the invention is suitable for single-phase operation. Single-phase DC brushless motor is advantageous in its relative simplicity in drive and feedback electronics and thus in addition to design efficiency and its advantages, the cost of manufacture is also relatively lower. However, with appropriate adjustments to the configuration, the vibration motor of the present invention is equally applicable to two- or three-phase designs should such motors be more suitable for certain applications.

As mentioned above, pole plates 115 and 116 of the upper and lower magnetic pole pieces 111 and 112 respectively must maintain a relative angular position to each other as the vibration motor is assembled. In the embodiment described herein, as is illustrated in FIGS. 1 and 2, the bobbin reel 113 has at least one stud 119 protruding from each of its end surfaces along the longitudinal axis of the motor. Matching positioning holes 117 and 118 can be set up on the corresponding upper and lower magnetic pole pieces 111 and 112. By appropriately locating these positioning studs and holes, upper and lower magnetic pole pieces 111 and 112 can be set to correct relative angular positions. Moreover, the Hall sensor 134 of the drive circuit 130 may as well be correctly positioned via the positioning stud 119 of the bobbin reel 113.

On the other hand, positioning stud 119 of the bobbin reel 113 may also extend along the longitudinal direction of the vibration motor for an appropriate length so as to maintain an appropriately sufficient spacing between consecutive components at both ends of the motor. For example, in an embodiment in which the drive circuit 130, together with its PCB 131, is assembled inside the motor casing 190, a sufficient spacing between the PCB 131 and either the upper 111 or the lower magnetic pole piece 112 must be maintained as the pieces are made of electrically-conductive laminated steel. Without adequate spacing, electrical shorting may arise. Due to the requirement of miniaturization in applications for the vibration motor of the invention, such spacing must be precisely controlled to the minimum possible level. By controlling the extension length of the studs 119, this can be achieved.

Figure 7:
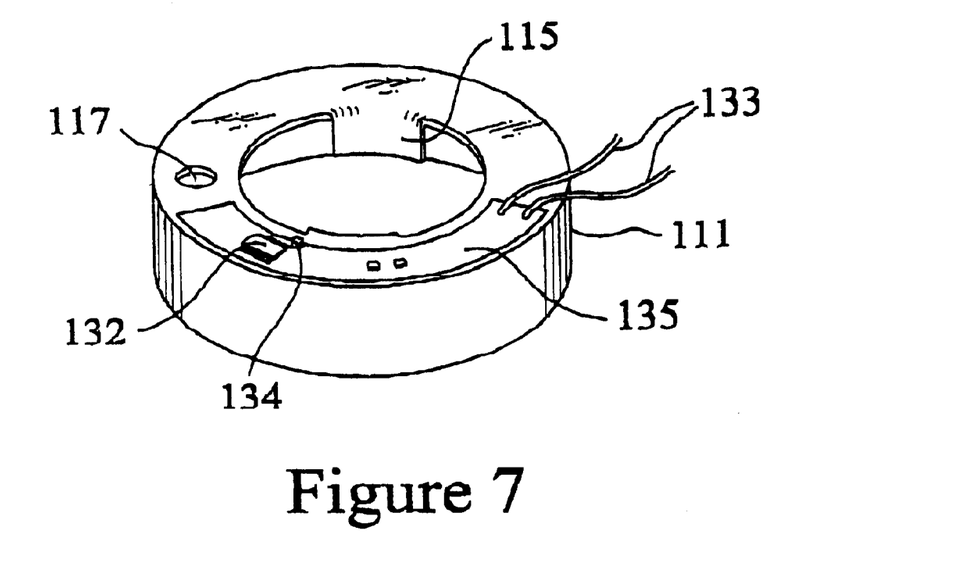
FIG. 7 is a perspective view of the upper magnetic pole piece illustrating the arrangement of an electronic drive circuitry on the top surface thereof.

In the embodiment as illustrated in FIGS. 1 and 2, although the drive circuit 130 is arranged on a piece of PCB, however, other forms of arrangement for the drive circuit are possible. FIG. 7 is a perspective view of the upper magnetic pole piece 111 illustrating an electronic drive circuit 130 being arranged on the top surface of the pole piece. Since the body of the pole piece 111 is normally electrically conductive itself, therefore, a layer of insulation generally identified by reference numeral 135 on its surface can be provided in order for the drive electronic circuit 130 to be disposed on top. Electrical routes can be formed over the surface of the insulation layer 135 and circuit components including drive IC 132, Hall sensor 134 and others can be mounted to the circuit. External electrical power can be supplied to the circuit via powerwires 133.

As is illustrated in the cross-sectional view of FIG. 2, rotor 120 has a mechanical configuration asymmetric to its center axis 121 of rotation. Such asymmetry shifts the center of mass of the entire rotor 120 away from the rotational axis 121. In the embodiment of FIG. 2, rotor 120 of the vibration motor of the invention is supported on a core shaft 122 aligned to the center axis 121.

As is more clearly shown in the perspective view of FIG. 1, rotor 120 is comprised of a rotor frame 123 having a generally-cylindrical structural configuration. One end of the cylindrical body is concave inward to form a recessed and ring-shaped space 125. As is seen in the perspective view, geometrical configuration of the rotor frame 123 can be achieved by, for example, low-cost pressing of sheet metal.

Over its external peripheral surface of the cylindrical body, the rotor frame 123 is firmly surrounded by a ring-shaped rotor magnet 129. In this described embodiment, the ring-shaped rotor magnet 129 may be magnetized to have a total of eight interleaving north and south magnetic poles. This is to be compatible with the total of eight pole plates, including four of both the upper and the lower magnetic pole piece 111 and 112.

Meanwhile, an eccentric weight 124 can be inserted into the recessed ring-shaped space 125 provided by the rotor frame 123 and remains securely fixed therein. In the described embodiment of the invention, this eccentric weight 124 may have a structural configuration matching the recessed space 125 inside the rotor frame 123. The inserted weight 124 may be securely fixed inside its assigned space 125 by, for example, application of adhesives.

A bearing housing room 126 is further provided at the center of the rotor frame 123. A bearing means 150 can be securely housed inside this space. The bearing means 150 can be used to support the rotor 120 inside the casing 190 of the vibration motor while allowing the rotor 120 to freely rotate on the core shaft 122. In a preferred embodiment, the rotor 120 can adopt a configuration in which the bearing means 150 is mounted onto the core shaft 122, which is fixed to the motor casing. However, as is comprehensible to those skilled in the art, other forms of bearing support are also possible and are within the scope of the present invention. For example, the entire rotor 120 may also be fixed to a core shaft that is supported at both ends by bearings installed to the casing 190 of the vibration motor 100.

Figure 3:
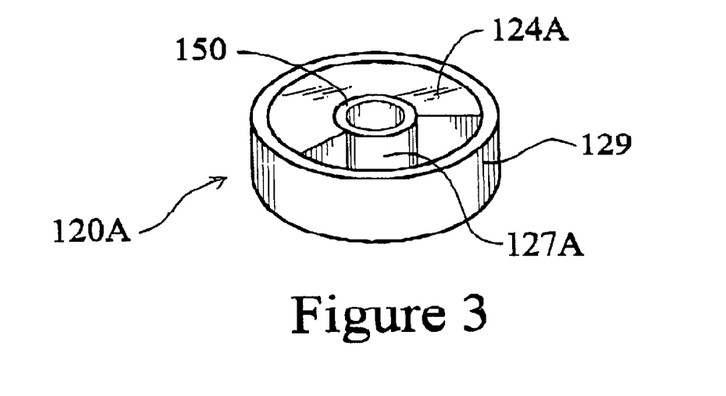
FIGS. 3, 4, 5 and 6 are perspective views illustrating respectively four of the preferred embodiments of the structural configuration of the eccentric rotor for the DC brushless vibration motor of the invention.

The eccentric weight as illustrated in FIGS. 1 and 2 is by no means the only possible configuration to provide eccentricity in order to produce mechanical vibration for the vibration motor of the invention. FIGS. 3–6 exemplify four more possible structural configurations of the eccentric weight that are applicable. Each of them is advantageously simple and inexpensive to manufacture. For example, the rotor 120A illustrated in the perspective view of FIG. 3 is comprised of a ring-shaped magnet 129, an eccentric weight 124A, and a rotor bearing 150. The ring-shaped magnet 129 and the bearing 150 is substantially similar in construction to that of the embodiment of FIGS. 1 and 2. However, the eccentric weight 124A is different in that it substantially is part of a ring. This eccentric weight 124A is in the form of a partial ring, which has a circumferential length constituting the major length of that of a complete ring. In other words, it can have a ring circumferential length that is about two-thirds the periphery of a total 360-degree ring. In other words, approximately one-third of the ring is removed, leaving a space generally identified as 127A. With this approximately one-third cut-away ratio, it is easy for the partial ring-shaped eccentric weight 124A to be securely fixed to the bearing means 150 with the assistance of, for example, adhesives. Mechanical vibration arises when the rotor 120A is propelled to rotate as a result of the apparent mass eccentricity of the eccentric weight 124A.

Figure 4:
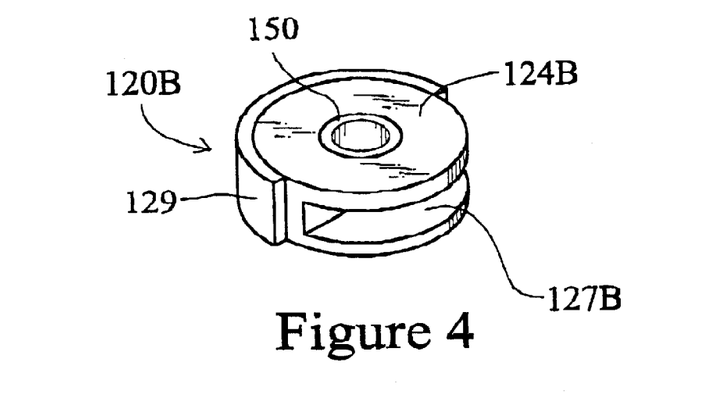

The rotor 120B of FIG. 4, when compared to that of FIG. 3, is of another alternative configuration of mass asymmetry. The eccentric weight 124B illustrated also has a basic configuration of a ring. However, a thick and sufficiently deep cut into the ring body on the peripheral surface along a selected radial direction results into a recessed space generally identified as 127B. As a result of the removal of mass from the recessed space 127B, mass eccentricity arises.

Figure 5:
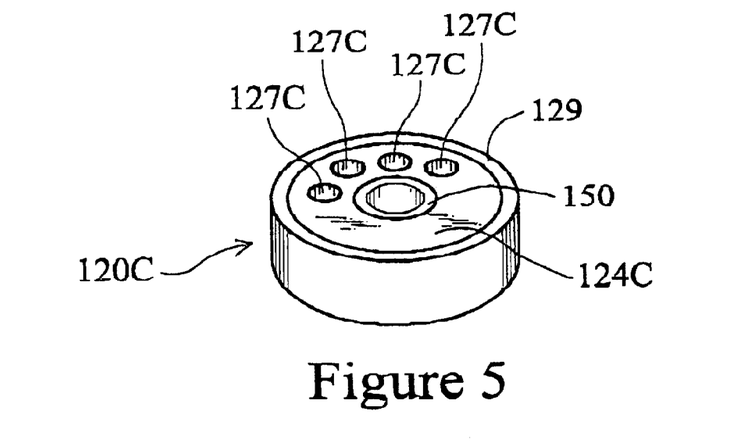

The rotor 120C of FIG. 5 illustrates still another alternative configuration for the eccentric weight. A number of holes 127C, four in the depicted example, are formed in the body of the generally ring-shaped eccentric weight 124C. Holes 127C are directed into the body of the eccentric weight 124C in directions generally parallel to the center axis of rotor rotation. As is comprehensible to persons skilled in the art, these holes 127C may or may not be through holes. Regardless of what total number these holes are and what sizes they have, center of mass of the weight 124C may be offset from the axis of rotation so long as they are located asymmetrically with respect to the center axis 121 of the vibration motor.

Figure 6:
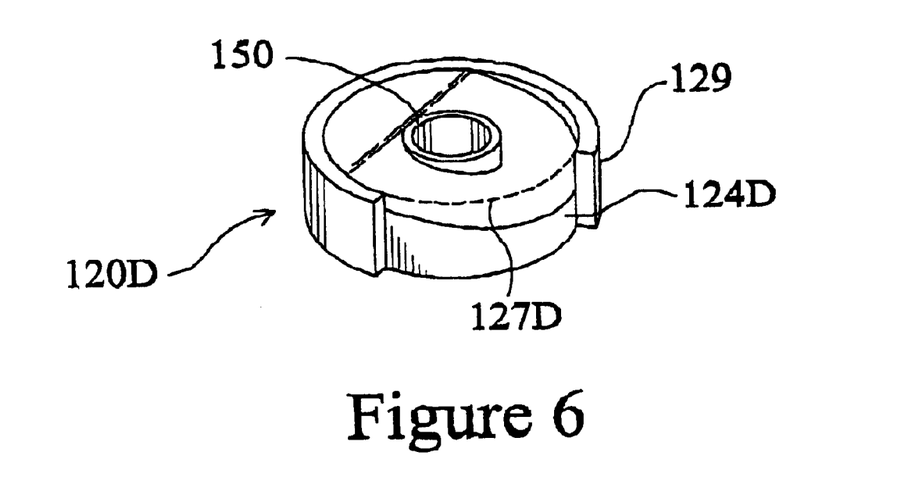

FIG. 6 illustrates yet another configuration of an applicable eccentric weight 124D for another rotor 120D. As is seen in the drawing, the weight 124D, in general, is still in the shape of a ringed body, but with one end along its longitudinal axis being partially cut in a tilted plane, whose normal line forms an angle with the center axis of rotor rotation. Such cutting, as is illustrated, which reveals an elliptical, or a portion of an elliptical contour, offsets the center of mass of the rotor 120D from its center axis of rotation.

Thus, regardless of which of the configurations among the embodiments of FIGS. 3 to 6 is adopted for the rotor, or any other similar ones not specifically enumerated herein, an air gap 140 must be maintained between the stator and rotor of the vibration motor. In other words, the air gap 140 must be maintained between the external peripheral surface of the ring magnet 129 of the rotor 120 and the opposing surfaces of the pole plates 115 and 116 of the upper 111 and lower magnetic pole piece 112 of the stator 110 of the inventive vibration motor 100.

Power supply wires 133 leading into the drive circuit 130 residing on the PCB 131 provides electric power from an external power source to the drive circuit 130. Under control of the drive IC 132 with feedback from the sensors such as Hall sensor 134, the external power supply may properly supply electric current to the stator field winding 114 and, as a result, propels the rotor 120 to rotate. Due to the nature of eccentricity in the rotor 120, mechanical vibration is produced when the vibration motor is driven.

According to the present invention, a miniaturized version of the vibration motor in accordance with the disclosure of the invention may be used in portable devices such as mobile phone handsets and pagers to provide mechanical vibration. Such is suitable for silent notification of incoming calls and/or messages. Enlarged versions of the vibration motor of the invention, on the other hand, are well suitable for applications such as massaging machines. Any other applications which require mechanical vibration are within the scope of the present invention.

While the above is a full description of the specific embodiments, various modifications, alternative constructions and equivalents may be used. For example, although the present invention is described with the PCB for the drive circuit installed inside the casing of the vibration motor, however, it can also be located externally in the extreme case that the motor must be made as small as possible. Further, although a Hall sensor is used as the rotor angular position locating means, other means such as optical sensors may also be advantageously utilized. Still further, although the pole number is described to be the same for both the stator and rotor of the vibration motor of the present invention, different total numbers of poles therein are also within the contemplation of the present invention. Further again, although the casing for the vibration motor of the present invention is described to be made of a cylindrical cup and an end plate, other forms such as two simple end plates each secured to the upper and lower magnetic pole piece respectively that are able to support adequate bearing means for the rotor to rotate may also be used. Certainly, a casing for the vibration motor in this form would require that the upper and lower magnetic pole pieces be securely attached to each other by, for example, allowing the inner peripheral surface of one pole piece to be tightly enclosing the corresponding outer peripheral surface of the other pole piece. Therefore, the above description and illustrations should not be taken as limiting the scope of the present invention which is defined by the appended claims.

What is claimed is:

1. A DC brushless vibration motor comprising:
   a stator having an upper magnetic pole piece, a lower magnetic pole piece and a field winding disposed therebetween;
   a rotor, disposed substantially within and coaxial with said stator, having a rotor magnet disposed therein, said rotor having a center of mass offset from the center axis of rotation of said rotor;
   a drive circuit for controlling an electric driving current to said field winding for electromagnetically inducing said rotor to rotate; and
   a casing for securely housing said stator and said rotor while maintaining an air gap therebetween.

2. The vibration motor of claim 1, wherein the upper magnetic pole piece and the lower magnetic pole piece are disposed substantially coaxial with each other and forming a ring-shaped space, and said stator field winding being disposed within said ring-shaped space.

3. The vibration motor of claim 1, wherein said rotor comprises a ring magnet and an eccentric weight, said ring magnet being disposed substantially coaxial with said rotor, said eccentric weight having a structural configuration of the form of a partial ring body, the circumferential length of said partial ring body constituting the major portion of the circumferential length of a complete ring, and said ring magnet being securely fixed to the external peripheral surface of said eccentric weight.

4. The vibration motor of claim 3, wherein said circumferential length of said partial ring body is approximately two-thirds of the circumferential length of a complete ring.

5. The vibration motor of claim 1, wherein said rotor comprises a rotor frame, a ring magnet and an eccentric weight, said rotor frame and said ring magnet being disposed substantially coaxial with said rotor, said rotor frame having a recessed and ring-shaped space for securely containing said eccentric weight, and said ring magnet being securely fixed to the external peripheral surface of said rotor frame.

6. The vibration motor of claim 1, wherein said rotor comprises a ring magnet and an eccentric weight, said ring magnet being disposed substantially coaxial with said rotor, said eccentric weight having the basic configuration of a ring body, with a thick and sufficiently deep cut formed into said ring body on the peripheral surface along a selected radial direction to form a recessed space, and said ring magnet being securely fixed to the external peripheral surface of said eccentric weight.

7. The vibration motor of claim 1, wherein said rotor comprises a ring magnet and an eccentric weight, said ring magnet being disposed substantially coaxial with said rotor, said eccentric weight having the basic configuration of a ring body, with at least one hole formed in said ring body, said at least one hole being directed into said ring body in directions generally parallel to the center axis of rotor rotation and located asymmetrically with respect to said axis, and said ring magnet being securely fixed to the external peripheral surface of said eccentric weight.

8. The vibration motor of claim 7, wherein said at least one hole are through holes.

9. The vibration motor of claim 7, wherein said at least one hole are non-through holes.

10. The vibration motor of claim 1, wherein said rotor comprises a ring magnet and an eccentric weight, said ring magnet being disposed substantially coaxial with said rotor, said eccentric weight having the basic configuration of a ring body, with one end along the longitudinal axis being partially cut in a tilted plane to reveals an elliptical, or a portion of an elliptical contour, and said ring magnet being securely fixed to the external peripheral surface of said eccentric weight.

11. The vibration motor of claim 1, wherein said drive circuit comprises a drive integrated circuit installed to a printed circuit board for controlling the rotation of said rotor by receiving an externally-supplied electric power.

12. The vibration motor of claim 11, wherein said drive circuit is installed inside said casing.

13. The vibration motor of claim 11, wherein said drive circuit is installed outside of said casing.

14. The vibration motor of claim 1, wherein said drive circuit comprises an integrated circuit installed to the surface of said stator.

15. A DC brushless vibration motor comprising:
a stator comprising an upper magnetic pole piece, a lower magnetic pole piece and a stator field winding, said upper and lower magnetic pole pieces being disposed substantially coaxial with each other and forming a ring-shaped space, and said stator field winding being disposed within said ring-shaped space;
a rotor with center of mass offset from the center axis of rotation and comprising a ring magnet and an eccentric weight, said ring magnet being disposed substantially coaxial with said rotor, said eccentric weight having a structural configuration of a ring body, and said ring magnet being securely fixed to the external peripheral surface of said eccentric weight;
a drive circuit for controlling an electric driving current to said field winding for electromagnetically inducing said rotor to rotate; and
a casing for securely housing said stator and said rotor while maintaining an air gap therebetween.

16. The vibration motor of claim 15, wherein said eccentric weight has a structural configuration of the form of a partial ring body, the circumferential length of said partial ring body constituting the major portion of the circumferential length of a complete ring, and said ring magnet is securely fixed to the external peripheral surface of said eccentric weight.

17. The vibration motor of claim 16, wherein said circumferential length of said partial ring body is approximately two-thirds of the circumferential length of a complete ring.

18. The vibration motor of claim 15, wherein said rotor further comprises a rotor frame disposed substantially coaxial with said rotor, said rotor frame having a recessed and ring-shaped space for securely containing said eccentric weight, and said ring magnet being securely fixed to the external peripheral surface of said rotor frame.

19. The vibration motor of claim 18, wherein said rotor frame has a generally cylindrical body and said recessed and ring-shaped space is formed by an inward concave at one end along the longitudinal axis of said cylindrical body.

20. The vibration motor of claim 19, wherein said eccentric weight has a shape and size suitable for assembly into said recessed and ring-shaped space of said rotor frame.

21. The vibration motor of claim 15, wherein said eccentric weight has the basic configuration of a ring body, with a thick and sufficiently deep cut into said ring body on the peripheral surface along a selected radial direction to form a recessed space, and said ring magnet is securely fixed to the external peripheral surface of said eccentric weight.

22. The vibration motor of claim 15, wherein said eccentric weight has the basic configuration of a ring body, with at least one hole formed in said ring body, said at least one hole are directed into said ring body in directions generally parallel to the center axis of rotor rotation and are located asymmetrically with respect to said axis, and said ring magnet is securely fixed to the external peripheral surface of said eccentric weight.

23. The vibration motor of claim 22, wherein said at least one hole are through holes.

24. The vibration motor of claim 22, wherein said at least one hole are non-through holes.

25. The vibration motor of claim 15, wherein said eccentric weight has the basic configuration of a ring body, with one end along the longitudinal axis being partially cut in a tilted plane to reveals an elliptical, or a portion of an elliptical contour, and said ring magnet is securely fixed to the external peripheral surface of said eccentric weight.

26. The vibration motor of claim 15, wherein said drive circuit comprises a drive integrated circuit mounted on a printed circuit board for controlling the rotation of said rotor by receiving an externally-supplied electric power.

27. The vibration motor of claim 26, wherein said drive circuit is installed inside said casing.

28. The vibration motor of claim 26, wherein said drive circuit is installed outside of said casing.

29. The vibration motor of claim 15, wherein said drive circuit comprises an integrated circuit installed to the surface of said stator.

30. The vibration motor of claim 15, wherein said upper magnetic pole piece and said lower magnetic pole piece of said stator have the same number of a plurality of magnetic pole plates each radially facing said air gap along the periphery of said stator, and said plurality of magnetic pole plates of said upper magnetic pole piece are interleaved with said plurality of magnetic pole plates of said lower magnetic pole piece.

31. The vibration motor of claim 15, wherein said stator further comprises a plurality of conductor coils wound around a bobbin reel.

32. The vibration motor of claim 15, wherein said casing comprises a cylindrical cup and an end plate, said cylindrical cup and said end plate form an enclosed protective space for securely containing said stator and said rotor.

33. The vibration motor of claim 32, wherein said casing further comprises a bearing means for supporting said rotor.

34. The vibration motor of claim 33, wherein said bearing means comprises a cylindrical core shaft having one end fixedly supported on said cylindrical cup and the other on said end plate, and the peripheral surface of said core shaft being suitable for mounting a bearing for carrying said rotor in free rotation.

35. The vibration motor of claim 33, wherein said bearing means comprises a cylindrical core shaft having one end rotatably supported by a first bearing on said cylindrical cup and the other by a second bearing on said end plate, and said core shaft being fixed to said rotor for carrying said rotor in free rotation.

36. The vibration motor of claim 15, wherein said drive circuit is installed inside said casing.

37. The vibration motor of claim 15, wherein said drive circuit is installed outside of said casing.

38. The vibration motor of claim 31, wherein at least one positioning stud protrudes from the surface of said bobbin reel at both ends thereof along the longitudinal direction, and at least one positioning hole is formed on each of the corresponding surfaces of said upper and lower magnetic pole pieces, and the relative alignment of said at least one positioning studs with respect to the corresponding positioning holes aligns said upper magnetic pole piece to said lower magnetic pole piece in an interleaved alignment.

39. The vibration motor of claim 38, wherein said drive circuit comprises a printed circuit board having a rotor angular position sensor mounted thereon, said printed circuit board has at least one positioning hole for receiving said at least one positioning stud of said bobbin reel, and said reception of said stud in said hole determines the relative angular position of said sensor on said printed circuit board.

40. The vibration motor of claim 39, wherein said rotor angular position sensor is a Hall sensor.

41. A DC brushless vibration motor comprising:
a stator comprising an upper magnetic pole piece, a lower magnetic pole piece and a stator field winding, said upper and lower magnetic pole pieces being disposed substantially coaxial with each other and forming a ring-shaped space and having same number of a plurality of magnetic pole plates each radially facing the center of said stator along the periphery of said stator and mutually interleaving, and said stator field winding comprises a plurality of conductor coils wound around a bobbin reel and is contained in said ring-shaped space;
a rotor having a center of mass offset from the center axis of rotation and comprising a ring magnet and an eccentric weight, said ring magnet being disposed substantially coaxial with said rotor, said eccentric weight having a structural configuration of the form of a partial ring body, the circumferential length of said partial ring body constituting the major portion of the circumferential length of a complete ring, and said ring magnet being securely fixed to the external peripheral surface of said eccentric weight;
a drive circuit comprising a drive integrated circuit for controlling an electric driving current to said field winding for electromagnetically inducing said rotor to rotate by receiving an externally-supplied electric power; and
a casing comprising a cylindrical cup and an end plate for securely housing said stator and rotor and further comprising a bearing means for supporting said rotor while maintaining an air gap therebetween.

42. A DC brushless vibration motor comprising:
a stator comprising an upper magnetic pole piece, a lower magnetic pole piece and a stator field winding, said upper and lower magnetic pole pieces being disposed substantially coaxial with each other and forming a ring-shaped space and having same number of a plurality of magnetic pole plates each radially facing the center of said stator along the periphery of said stator and mutually interleaving, and said stator field winding comprises a plurality of conductor coils wound around a bobbin reel and is contained in said ring-shaped space;
a rotor having a center of mass offset from the center axis of rotation and comprising a rotor frame, a ring magnet and an eccentric weight, said rotor frame and said ring magnet being disposed substantially coaxial with said rotor and having a recessed and ring-shaped space formed by an inward concave at one end along the longitudinal axis of said cylindrical body for securely containing said eccentric weight, and said ring magnet being securely fixed to the external peripheral surface of said rotor frame;
a drive circuit comprising a drive integrated circuit for controlling an electric driving current to said field winding for electromagnetically inducing said rotor to rotate by receiving an externally-supplied electric power; and
a casing comprising a cylindrical cup and an end plate for securely housing said stator and rotor and further comprising a bearing means for supporting said rotor while maintaining an air gap therebetween.

43. A DC brushless vibration motor comprising:
a stator comprising an upper magnetic pole piece, a lower magnetic pole piece and a stator field winding, said upper and lower magnetic pole pieces being disposed substantially coaxial with each other and forming a ring-shaped space and having same number of a plurality of magnetic pole plates each radially facing the center of said stator along the periphery of said stator and mutually interleaving, and said stator field winding comprises a plurality of conductor coils wound around a bobbin reel and is contained in said ring-shaped space;
a rotor having a center of mass offset from the center axis of rotation and comprising a ring magnet and an eccentric weight, said ring magnet being disposed substantially coaxial with said rotor and said eccentric weight having the basic configuration of a ring body, with a thick and sufficiently deep cut into said ring body on the peripheral surface along a selected radial direction to form a recessed space, and said ring magnet is securely fixed to the external peripheral surface of said eccentric weight;
a drive circuit comprising a drive integrated circuit for controlling an electric driving current to said field winding for electromagnetically inducing said rotor to rotate by receiving an externally-supplied electric power; and
a casing comprising a cylindrical cup and an end plate for securely housing said stator and rotor and further comprising a bearing means for supporting said rotor while maintaining an air gap therebetween.

44. A DC brushless vibration motor comprising:

a stator comprising an upper magnetic pole piece, a lower magnetic pole piece and a stator field winding, said upper and lower magnetic pole pieces being disposed substantially coaxial with each other and forming a ring-shaped space and having same number of a plurality of magnetic pole plates each radially facing the center of said stator along the periphery of said stator and mutually interleaving, and said stator field winding comprises a plurality of conductor coils wound around a bobbin reel and is contained in said ring-shaped space;

a rotor having a center of mass offset from the center axis of rotation and comprising a ring magnet and an eccentric weight, said ring magnet being disposed substantially coaxial with said rotor and said eccentric weight having the basic configuration of a ring body, with at least one hole formed in said ring body, said at least one hole being directed into said ring body in directions generally parallel to the center axis of rotor rotation and located asymmetrically with respect to said axis, and said ring magnet being securely fixed to the external peripheral surface of said eccentric weight;

rotor is propelled to rotate by said stator;

a drive circuit comprising a drive integrated circuit for controlling an electric driving current to said field winding for electromagnetically inducing said rotor to rotate by receiving an externally-supplied electric power; and a casing comprising a cylindrical cup and an end plate for securely housing said stator and rotor and further comprising a bearing means for supporting said rotor while maintaining an air gap therebetween.

45. A DC brushless vibration motor comprising:

a stator comprising an upper magnetic pole piece, a lower magnetic pole piece and a stator field winding, said upper and lower magnetic pole pieces being disposed substantially coaxial with each other and forming a ring-shaped space and having same number of a plurality of magnetic pole plates each radially facing the center of said stator along the periphery of said stator and mutually interleaving, and said stator field winding comprises a plurality of conductor coils wound around a bobbin reel and is contained in said ring-shaped space;

a rotor having a center of mass offset from the center axis of rotation and comprising a ring magnet and an eccentric weight, said ring magnet being disposed substantially coaxial with said rotor and said eccentric weight having the basic configuration of a ring body, with one end along the longitudinal axis being partially cut in a tilted plane to reveals an elliptical, or a portion of an elliptical contour, and said ring magnet being securely fixed to the external peripheral surface of said eccentric weight;

a drive circuit comprising a drive integrated circuit for controlling an electric driving current to said field winding for electromagnetically inducing said rotor to rotate by receiving an externally-supplied electric power; and a casing comprising a cylindrical cup and an end plate for securely housing said stator and rotor and further comprising a bearing means for supporting said rotor while maintaining an air gap therebetween.

46. The vibration motor of any of claims 41 to 45, wherein said bearing means comprises a cylindrical core shaft having one end fixedly supported on said cylindrical cup and the other on said end plate, and the peripheral surface of said core shaft being suitable for mounting a bearing for carrying said rotor in free rotation.

47. The vibration motor of any of claims 41 to 45, wherein said bearing means comprises a cylindrical core shaft having one end rotatably supported by a first bearing on said cylindrical cup and the other by a second bearing on said end plate, and said core shaft being fixed to said rotor for carrying said rotor in free rotation.

48. The vibration motor of any of claims 41 to 45, wherein said drive circuit is installed inside said casing.

49. The vibration motor of any of claims 41 to 45, wherein said drive circuit is installed outside of said casing.

50. The vibration motor of any of claims 41 to 45, wherein at least one positioning stud protrudes from the surface of said bobbin reel at both ends of said bobbin reel along the longitudinal direction, and at least one positioning hole is formed on each of the corresponding surfaces of said upper and lower magnetic pole pieces, and the relative alignment of said at least one positioning studs with respect to the corresponding positioning holes aligns said upper magnetic pole piece to said lower magnetic pole piece in an interleaved alignment.

51. The vibration motor of any of claims 41 to 45, wherein said drive circuit comprises a printed circuit board having a rotor angular position sensor mounted thereon, said printed circuit board having at least one positioning hole for receiving said at least one positioning stud of said bobbin reel, and said reception of said stud in said hole determining the relative angular position of said sensor on said printed circuit board, at least one positioning stud protruding from the surface of said bobbin reel at both ends of said bobbin reel along the longitudinal direction, at least one positioning hole being formed on each of the corresponding surfaces of said upper and lower magnetic pole pieces, and the relative alignment of said at least one positioning studs with respect to the corresponding positioning holes aligning said upper magnetic pole piece to said lower magnetic pole piece in an interleaved alignment.

52. The vibration motor of any of claims 41 to 45, wherein said drive circuit comprises a printed circuit board having a rotor angular position sensor mounted thereon, said printed circuit board having at least one positioning hole for receiving said at least one positioning stud of said bobbin reel, and said reception of said stud in said hole determining the relative angular position of said sensor on said printed circuit board, at least one positioning stud protruding from the surface of said bobbin reel at both ends of said bobbin reel along the longitudinal direction, at least one positioning hole being formed on each of the corresponding surfaces of said upper and lower magnetic pole pieces, the relative alignment of said at least one positioning studs with respect to the corresponding positioning holes aligning said upper magnetic pole piece to said lower magnetic pole piece in an interleaved alignment, and said angular position sensor being a Hall sensor.

* * * * *